(12) United States Patent
Fröberg Olsson et al.

(10) Patent No.: US 9,397,813 B2
(45) Date of Patent: Jul. 19, 2016

(54) EXTENDING THE CONTROL CHANNEL REGION OF A COMMUNICATIONS SYSTEM IN BACKWARDS COMPATIBLE MANNER

(75) Inventors: Jonas Fröberg Olsson, Ljungsbro (SE); Pål Frenger, Linköping (SE); John Skördeman, Brokind (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 211 days.

(21) Appl. No.: 14/127,514

(22) PCT Filed: Jun. 22, 2011

(86) PCT No.: PCT/SE2011/050821
§ 371 (c)(1),
(2), (4) Date: Dec. 19, 2013

(87) PCT Pub. No.: WO2012/177195
PCT Pub. Date: Dec. 27, 2012

(65) Prior Publication Data
US 2014/0133423 A1    May 15, 2014

(51) Int. Cl.
*H04L 5/00* (2006.01)
*H04L 27/26* (2006.01)

(52) U.S. Cl.
CPC ............ *H04L 5/0053* (2013.01); *H04L 5/0094* (2013.01); *H04L 27/2601* (2013.01)

(58) Field of Classification Search
CPC ....... H04L 5/0053; H04L 5/0094; H04L 5/00; H04W 72/00; H04W 72/04; H04W 72/042; H04W 72/0486
See application file for complete search history.

(56) References Cited

U.S. PATENT DOCUMENTS

| | | | | |
|---|---|---|---|---|
| 8,824,366 | B2 * | 9/2014 | Lee et al. | H04J 11/0069 370/206 |
| 2004/0213182 | A1 * | 10/2004 | Huh | H04L 1/0002 370/332 |
| 2011/0255486 | A1 * | 10/2011 | Luo | H04W 48/12 370/329 |
| 2012/0093104 | A1 * | 4/2012 | Tiirola | H04L 5/0053 370/329 |

OTHER PUBLICATIONS

Author Unknown, "PDCCH Enhancement Considerations," Research in Motion, UK Limited; 3GPP TSG RAN WG1 Meeting #65; R1-111661; May 9-13, 2011. pp. 1-4. Barcelona, Spain.

(Continued)

*Primary Examiner* — Anh Ngoc Nguyen
(74) *Attorney, Agent, or Firm* — Patents on Demand, P.A.; Brian K. Buchheit; Scott M. Garrett

(57) ABSTRACT

In a method of adapting a control channel in a network node in a communication system, providing (S20) a control format indicator for the control channel, and dynamically determining and providing (S10) control channel redefinition information, which control channel redefinition information together with said control format indicator provides a redefined control channel. Subsequently the control channel is adapted (S30) based on said control format indicator and said control channel redefinition information to provide a redefined control channel for signaling to said at least one user equipment, Finally, scheduling (S40) user equipment in a sub frame based on the redefined control channel.

14 Claims, 7 Drawing Sheets

(56) References Cited

OTHER PUBLICATIONS

Author Unknown, "DL Control Channel Enhancement for DL MIMO in Rel-11," NTT DOCOMO; 3GPP TSG RAN WG1 Meeting #65; R1-111636; May 9-13, 2011. pp. 1-6. Barcelona, Spain.

3rd Generation Partnership Project, "3GPP TS 36.212 V10.1.0 (Mar. 2011)," 3rd Generation Partnership Project; Technical Specification Group Radio Access Network; Evolved Universal Terrestrial Radio Access (E-UTRA); Multiplexing and channel coding (Release 10). Mar. 2011. pp. 1-76.

\* cited by examiner

EXTENDING THE CONTROL CHANNEL REGION OF A COMMUNICATIONS SYSTEM IN BACKWARDS COMPATIBLE MANNER

TECHNICAL FIELD

The present disclosure relates to communication systems in general, and specifically to methods and arrangements for adapting control resources in such systems.

BACKGROUND

All modern cellular communication systems use control signaling for communicating common and user-specific information to the user equipments (UEs) in the system. When striving for a higher bit rate, modern cellular communication systems such as 3GPP LTE (Long Term Evolution) Rel-10 are now targeting so-called carrier aggregation. The aggregation can be performed at different layers in the protocol stack. LTE is typically targeting performing the aggregation above the hybrid-ARQ (hybrid Automatic Repeat reQuest) functionality, see 3GPP TS 36.212, "Multiplexing and channel coding", V10.1.0 (2011-03). Moreover, for Rel-10 of the 3GPP specifications, each component carrier shall be accessible by Rel-8 terminals.

To support the transmission of downlink and uplink transport channels, there is a need for certain associated downlink control signaling. This control signaling is often referred to as the downlink L1/L2 (Layer 1/Layer 2) control signaling, indicating that the corresponding information partly originates from the physical layer (Layer 1) and the Layer 2 MAC. Typically, the L1/l2 control signaling is transmitted within the first part of each sub-frame. Thus, each sub-frame can be said to be divided into a control region followed by a data region, where the control region corresponds to the part of the sub-frame in which the L1/L2 control signaling is transmitted. For current LTE systems, the control signaling performed for each downlink sub-frame is located in the first n OFDM (Orthogonal Frequency Multiplexing) symbols, where n≤3. The downlink L1/L2 control signaling corresponds to three different physical channel types, namely the Physical Control Format Indicator Channel (PCFICH) informing the terminal about the size of the control region (one, two or three OFDM symbols), the Physical Downlink Control Channel (PDCCH) for signaling downlink scheduling assignments and uplink scheduling grants, and the Physical Hybrid-ARQ Indicator CHannel (PHICH) for signaling hybrid-ARQ acknowledgments in response to uplink UL-SCH transmissions. The PCFICH consists of two bits of information that are always mapped to the first OFDM symbol of each subframe in order to enable the user equipment to find the control channels, and to locate the start of the data region for the corresponding subframe.

In prior art, as represented by [1] two approaches for the downlink control signaling are described, namely:
1) A separate PDCCH (Physical Downlink Common Control Channel) per scheduled component carrier.
2) A single PDCCH containing information for all scheduled component carriers.

For both these approaches, it is possible to transmit the single or the separate PDCCH on one of the component carriers only. In such a case, the carrier that carries the PDCCH (or PDCCHs) is referred to as the anchor carrier and the other (scheduled) carriers as extension carriers.

For current LTE systems, as mentioned previously, the control signaling performed for each downlink sub-frame is located in the first n OFDM symbols, where n≤3. The entire sub-frame typically comprises 14 OFDM symbols. The downlink control signaling consists of a format indicator to indicate the number of OFDM symbols used for control in the present sub-frame; scheduling control information (downlink assignments and uplink scheduling grant); and downlink ACK/NACK associated with uplink data transmission.

An example of how the number of simultaneous scheduling grants varies with the frequency of the carrier and with the size of the control region is shown below in Table 1. In the example #CCE/PDCCH=8 which is the maximal value, and the network node is configured with two antenna ports.

TABLE 1

|         | Control Region Size 1 | Control Region Size 2 | Control Region Size 3 |
|---------|---|---|----|
| 5 MHz   | 0 | 1 | 2  |
| 10 MHz  | 1 | 3 | 5  |
| 20 MHz  | 2 | 6 | 10 |

The above-described current PDCCH design can in some cases cause the system to become control channel limited, e.g., there is a need for more control signaling than there are available control resources. This may in turn result in a non-optimal use of the data region of each subframe. In other words, the lack of control resources will reduce the number of users scheduled in the sub frame, thus leaving part of the resources available for data transmission unused. Some specific examples of control channel limitations will be described below.

One example concerns the case when there is a large number of low data-rate UEs in the cell. In this scenario, there is a need to schedule a plurality of UEs at the same time, each with a small resource allocation. This typically happens when there are many VoIP (Voice over Internet Protocol) users or when there is a high level of machine-to-machine communication.

A further example concerns the case of cross-carrier scheduling, i.e. a UE reads the PDCCH on one carrier and is assigned physical resources on another carrier. In this case, the PDCCH load on the anchor carrier increases and there is a risk of PDCCH limitation.

Yet another example concerns the case where the anchor carrier has a narrow bandwidth e.g. is bandwidth limited. If one wants to introduce new features in the future then there is a possibility to introduce new non-backwards compatible extension carriers. In order to still support legacy terminals there is a need to have a legacy carrier. In addition, when the number of the legacy UEs decreases with time it is natural to reduce the bandwidth that is allocated to legacy UE support. Another reason for having a narrow band anchor carrier is for energy saving reasons. A narrow bandwidth carrier requires less transmission power than a wide band carrier does and hence it is possible to save energy when the traffic is low by turning off extension carriers and only keeping a narrow band carrier activated in order to ensure coverage.

If the system, due to the above mentioned problems, runs out of PDCCH resources whilst there are still physical downlink resources left on the PDSCH or physical uplink resources on the PUSCH that could have been assigned to active users, then that is a problem since those resources are wasted.

A previously presented solution to the above-mentioned problem is to extend the control region size, and has been discussed in the 3GPP. The solution uses a "secondary" PCFICH (transmitted as a regular Rel-8 PDCCH) that determines the size of the total PDCCH. This solution was regarded as too complicated since the UE needs to dynamically determined extension grants in two steps: first determine the total size of the PDCCH and then decode the "extension PDCCH".

Due to the above-mentioned problems, there is a need for a method of extending the control region size without increasing the complexity of the UE processing, and at the same time enabling both legacy user equipments and new user equipments to properly interpret the control signaling in order to provide a more efficient utilization of the control and data resources.

SUMMARY

The present disclosure aims to obviate some of the above-mentioned problems, and to provide improved utilization of control resources in a wireless communication system.

A first aspect of the present disclosure presents a method of adapting a control channel in a network node in a communication system, by providing a control format indicator for the control channel. Subsequently, determining and providing control channel redefinition information, which control channel redefinition information together with the control format indicator provides a redefined control channel. The control channel is then adapted based on the provided control format indicator and the control channel redefinition information to provide a redefined control channel for signaling to at least one user equipment. Finally, user equipments are scheduled in a sub frame based on the redefined control channel.

A second aspect of the present disclosure presents a method of interpreting a redefined control channel in an user equipment in a communication system, by receiving, in a sub frame, a control format indicator from a network node, which control format indicator provides information about a size of the control channel of the sub frame. Subsequently, the method includes receiving control channel redefinition information from the network node, which control channel redefinition information together with the received control format indicator provides interpretation of a redefined control channel. Finally, control information and optionally data are retrieved from at least the sub frame based on the interpreted redefined control channel.

A third aspect of the present disclosure presents a network node in a communication system. The network node includes, a control format indicator provider configured for providing a control format indicator for a control channel, a control channel redefinition information provider configured for determining and providing control channel redefinition information for the control channel, which control channel redefinition information together with the control format indicator provides a redefined control channel. Finally, the network node includes a scheduler configured for scheduling at least one user equipment in a sub frame based on the redefined control channel.

A fourth aspect of the present disclosure presents a user equipment in a communication system. The user equipment includes, a control format receiver configured for receiving a control format indicator from a network node, which control format indicator provides information about a size of a control channel of the sub frame. Further, the user equipment includes a control channel redefinition information receiver configured for receiving control channel redefinition information from the network node, which control channel redefinition information together with the received control format indicator provides interpretation of a redefined control channel. Finally, the user equipment includes a retriever configured for retrieving control information and optionally data from a sub frame based on the interpreted redefined control channel.

Advantages of the present disclosure include an improved utilization of control resources. Further, the present disclosure enables a dynamical adaptation of the control channel or control region of a subframe.

BRIEF DESCRIPTION OF THE DRAWINGS

The invention, together with further objects and advantages thereof, may best be understood by referring to the following description taken together with the accompanying drawings, in which.

DETAILED DESCRIPTION

Throughout the drawings, the same reference numbers are used for similar or corresponding elements. The present disclosure is mainly described in the context of a LTE system, but the disclosure can likewise be utilized in other similar systems. The description discloses a network node in general, but the same or corresponding features may be beneficially implemented in a radio base station in a communication system.

Figure 1:
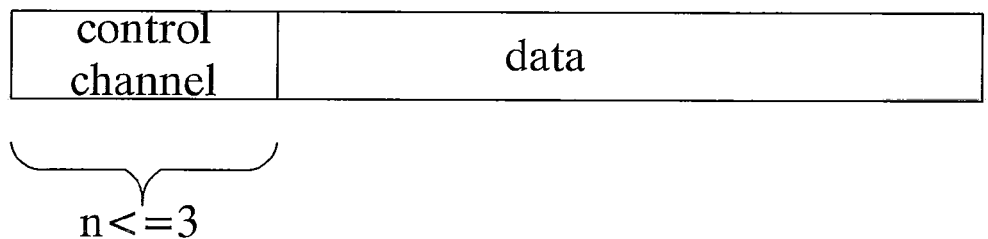
FIG. 1 is an example of a prior art subframe.
Figure 2:
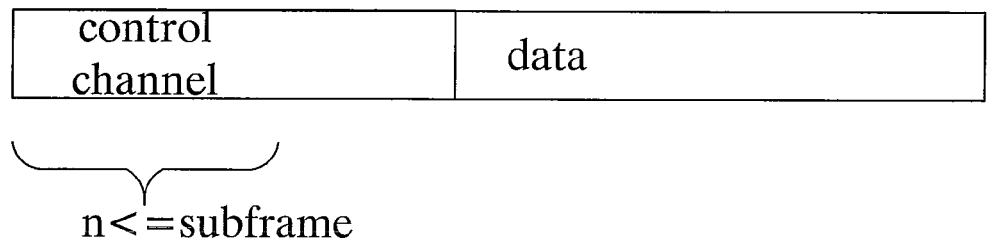
FIG. 2 is an embodiment of a subframe according to the present disclosure.

Basically, the present disclosure presents a novel method of interpreting the two bits carried by the PCFICH such that the precise meaning is different for different UEs e.g. UEs conforming to different versions of the operating system. The different interpretations of the two bits carried by the PCFICH may be configured by higher layer, e.g. cell-specific system information or by using dedicated signaling at call setup or a the request by a user equipment or other node. By the differentiated interpretation of the two bits carried by the PCFICH it is possible to dynamically adapt the control region size e.g. to extend the control region for certain UEs, as is indicated in FIG. 1 and FIG. 2. Instead of the control region being limited to occupy at most 3 OFDM symbols it is possible to allocate an entire subframe to the control region.

In the following description, the terms control channel and control region will be used interchangeably.

Figure 3:
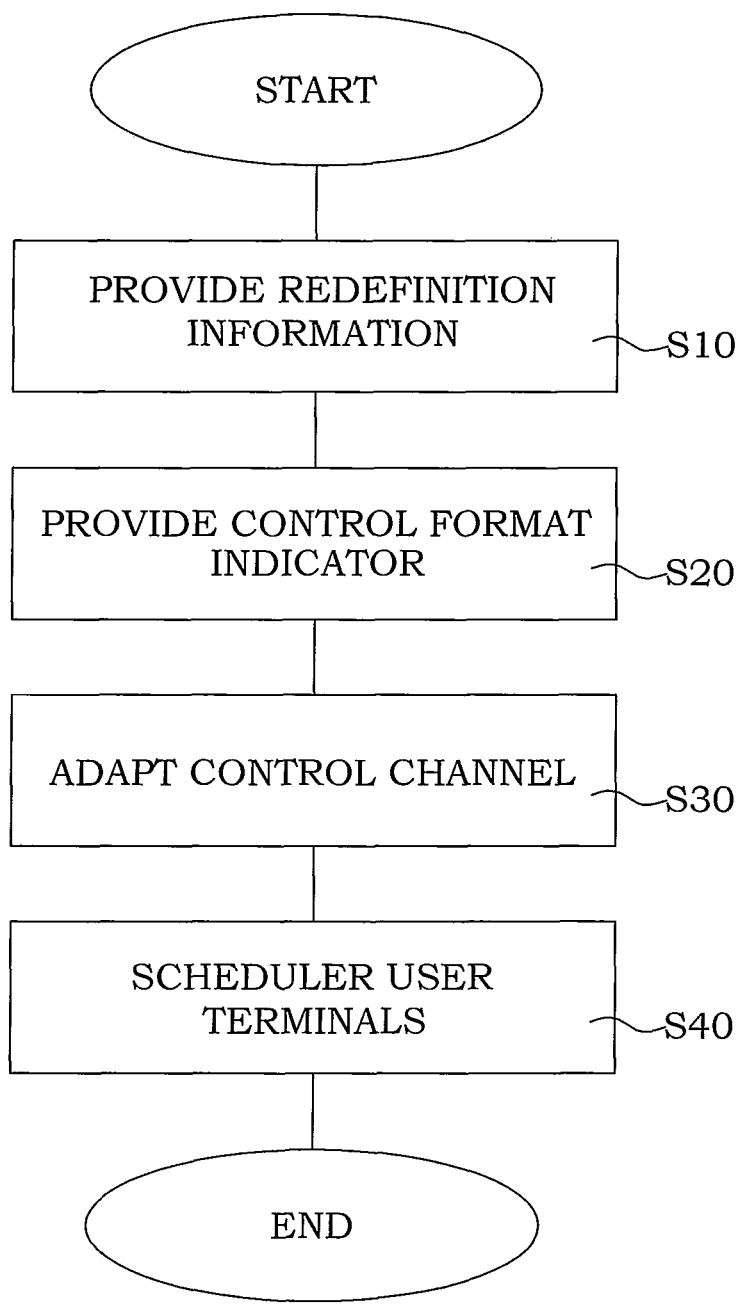
FIG. 3 is a flow chart of an embodiment of a method according to the present disclosure.

A basic embodiment of the disclosure, with reference to FIG. 3, presents a method of adapting a control channel or control region in a network node in a communication system by providing S20 a control format indicator for the control channel or region, and subsequently dynamically determining and providing S10 control channel redefinition information. In a next step, the control channel is adapted S30 based on the provided control format indicator and the control channel redefinition information to provide a redefined control channel. Finally, user equipment are scheduled S40 in a sub frame based on the redefined control channel. Although the steps of the method are illustrated in a particular order, it is possible to change the order of the steps without departing from the inventive concept. In particular, the steps of providing the control format indicator and the control channel redefinition information can be exchanged without affecting the actual outcome of the method, since both parameters are taken into account when redefining the control channel.

The control channel redefinition information may beneficially comprise an offset parameter. The offset parameter can comprise an integer, which is provided for all values of the control format indicator. However, it is also possible to define the offset parameter as a function of the control format indicator values in order to enable a diversified extension of the control region of the subframes. According to a further embodiment, the control channel redefinition information may provide information that enables the user to select a completely different interpretation table for the provided control format indicators when compared to a legacy user.

Figure 4:
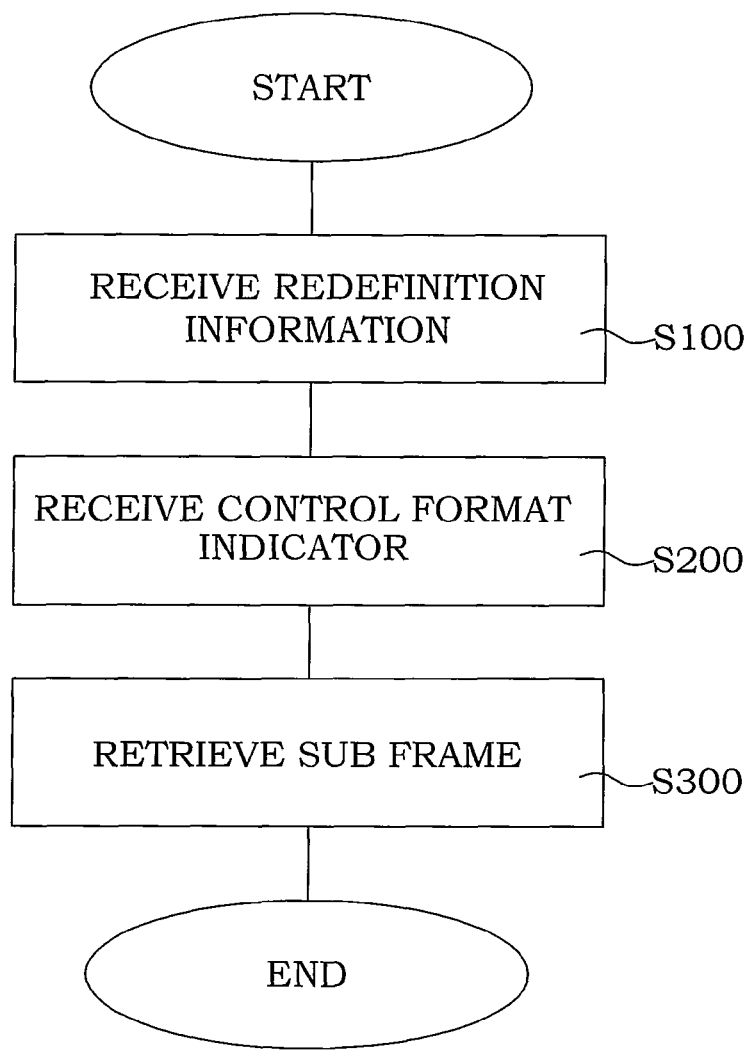
FIG. 4 is a flow chart of an embodiment of a method according to the present disclosure.

An embodiment of a method of interpreting a redefined control channel in a user equipment in a communication system will be described below with reference to FIG. 4. A Rel-Z user equipment receives S200 in a sub frame, a control format indicator from a network node, which control format indicator provides information about a size of the control channel or control region of the sub frame. Implicitly this informs the user equipment of the start of the data region of the subframe. Additionally, the user equipment receives S100 control channel redefinition information e.g. control channel offset parameter, typically from the network node, which control channel redefinition information together with the received control format indicator enables the user equipment to interpret a redefined control channel. Finally, the user equipment interprets the redefined control channel based on the control format indicator and the offset parameter and retrieves S300 control information and optionally data from at least the sub frame based on the interpreted redefined control channel.

As mentioned before, in certain scenarios the size of the control region e.g. PDCCH may be limiting the achievable bit rate. For example, when there are many users with chatty delay sensitive traffic (e.g. gaming) together with some bulk data users. In such a scenario, the desired average number of simultaneously scheduled users may exceed the available average number of simultaneously scheduled users supported by Rel-8 compatible PDCCH.

In one embodiment of the disclosure the higher layer configuration alters the interpretation of the two bits carried by PCFICH for UEs supporting the invention, here referred to as Rel-Z UEs. One exemplifying re-definition could be $$CRS_{Rel-Z} = CRS_{Rel-8} + E,$$

where E may take the values 0, 1, 2, ..., 11. Where $CRS_{Rel-Z}$ denotes the redefined size of the control region for Rel-Z users, $CRS_{Rel-8}$ denotes the original size of the control region as indicated by the provided control format indicator, and where E denotes control channel redefinition information e.g. the control channel offset parameter. With the offset parameter E=0 Rel-Z and Rel-8 UEs will have the same interpretation of the two bits carried by PCFICH. With the offset parameter set to E=11 the extended PDCCH (E-PDCCH) will occupy all available OFDM symbols (no data can be transmitted in the downlink (DL)) if $CRS_{Rel-8}$=3 and if $CRS_{Rel-8}$=2 one OFDM symbol is available for transmitting data. The offset parameter is only available or provided for Rel-Z user equipment. The offset parameter can be provided by means of higher level signaling, e.g. during start up of the user equipment or as a specific signaling upon request from the user equipment. In this embodiment, all control format indicator values are extended with the offset parameter. Further, in this case the offset parameter enables an extension of the control region in the time domain.

One implication of the above describe scenario is that since, according to the present disclosure, Rel-8 and Rel-Z UEs will utilize different interpretations of the size (in OFDM symbols) of the control region those UE-types may typically not be scheduled simultaneously. If they are scheduled simultaneously, Rel-8 UEs will assume data transmitted on OFDM symbols used by the extended PDCCH, which would result in poor performance.

Figure 5:
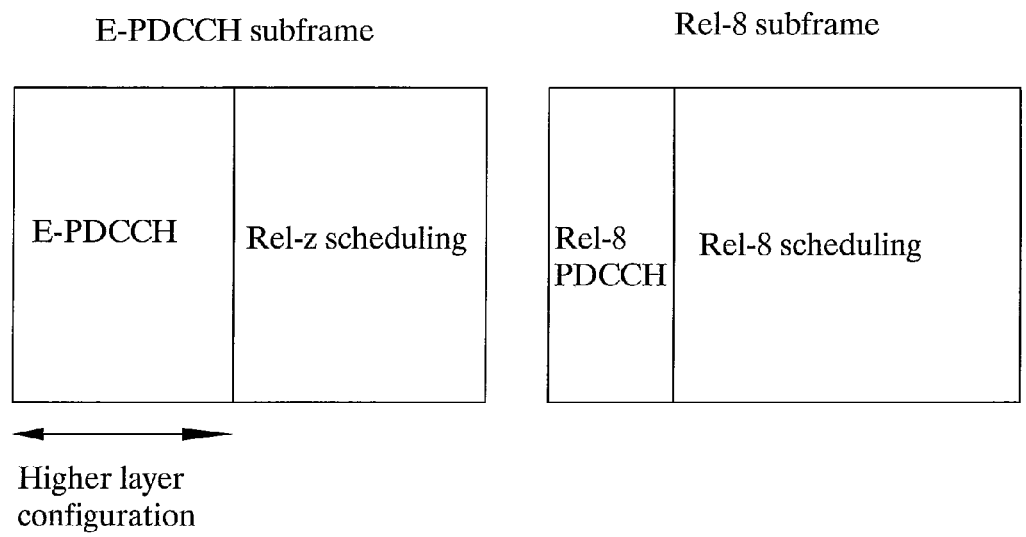
FIG. 5 illustrates an embodiment of configuration of subframes according to the present disclosure.

One solution to avoid the risk of legacy user equipment interpreting an OFDM symbol in an extended control region as a data containing OFDM symbol would be to have some subframes with extended PDCCH (E-PDCCH) where the altered interpretation of the PCFICH is valid, as is illustrated by FIG. 5. For the rest of the subframes the legacy or Rel-8 interpretation of the PCFICH is applied. During E-PDCCH subframes, no Rel-8 UEs may be scheduled in the downlink. However, to avoid impact on uplink (UL) grants and the PHICH (Physical Hybrid ARQ Indicator Channel) the E-PDCCH can have a Rel-8 compatible part where the uplink grants and the PHICH are carried.

An alternative embodiment to the above described disclosure, is to provide the control channel redefinition information e.g. offset parameter only in relation to some of the control format indicator values provided on the PCFICH. One option would be to use the offset parameter as a pointer towards a different interpretation table in the user equipment. Some examples of various re-interpretations of the control format indicator values are provided below in Table 2-6. The most straightforward re-interpretation of the control format indicators would be to use the "00" value, since that has no meaning to a Rel-8 user thus preventing mis-interpretation of the information by a Rel-8 user.

In one embodiment, with reference to Table 2, only the control format indicator value of "00" is re-defined, using the control channel redefinition information, with higher layer configuration of Rel-Z user equipment, the Table 2 illustrates the number of OFDM symbols available for the control region or PDCCH. Consequently, by providing a control indicator value of "00" and an offset parameter, the network node can provide a redefined or extended control region for Rel-Z user equipment. The actual size of the extended control region can be determined based on various factors, such as a current load in the system or network node, statistics about the types of user equipment in the system etc.

TABLE 2

| PCFICH bits | Rel-8 | Rel-Z with higher layer configuration |
|---|---|---|
| 00 | "Protocol error" | Configured by higher layers (e.g. 4, ..., 14) |
| 01 | 1 | 1 |
| 10 | 2 | 2 |
| 11 | 3 | 3 |

Typically, OFDM transmission offers the possibility to make synchronous multi-cell multicast/broadcast transmissions appear as a transmission from a single point over a time-dispersive channel. For LTE this is referred to as Multicast/Broadcast over Single Frequency Network (MBSFN). In MBSFN the sub frame structure is different from what is described earlier in this disclosure, resulting in a subframe without any OFDM symbols available for the PDCCH. However, by using the possibility to extend the control region according to the present disclosure, it is possible to provide a PDCCH which is non-empty, as is illustrated in Table 3.

TABLE 3

| PCFICH bits | Rel-8 | Rel-Z with higher layer configuration |
| --- | --- | --- |
| 00 | 0 | 1 |
| 01 | Not allowed | 2 |
| 10 | Not allowed | 3 |
| 11 | Not allowed | 4 |

With reference to Table. 4, a further embodiment of extending the control region of a subframe according to the present disclosure is illustrated. In this embodiment, the offset parameter is only provided for the highest control format indicator value, namely "11". This is suitable for the situation where the number of resource blocks in the subframe exceeds 10 $N_{RB}^{DL}>10$. Other assumptions are a frame structure type 1, and non-MBSFN subframes.

TABLE 4

| PCFICH bits | Rel-8 | Rel-Z with higher layer configuration |
| --- | --- | --- |
| 00 | Not allowed | Not allowed |
| 01 | 1 | 1 |
| 10 | 2 | 2 |
| 11 | 3 | Configured by higher layers (e.g. 3, . . . , 14) |

In a corresponding manner, Table. 5 illustrates the situation where the number of resource blocks in the subframe does not exceed 10 e.g. $N_{RB}^{DL} \leq 10$. In this example the system bandwidth is smaller, thus the control region can be 1-3 for Rel-8 and a larger bandwidth and 2-4 for the smaller bandwidth.

TABLE 5

| PCFICH bits | Rel-8 | Rel-Z with higher layer configuration |
| --- | --- | --- |
| 00 | Not allowed | Not allowed |
| 01 | 2 | 2 |
| 10 | 3 | 3 |
| 11 | 4 | Configured by higher layers (e.g. 4, . . . , 14) |

Figure 6:
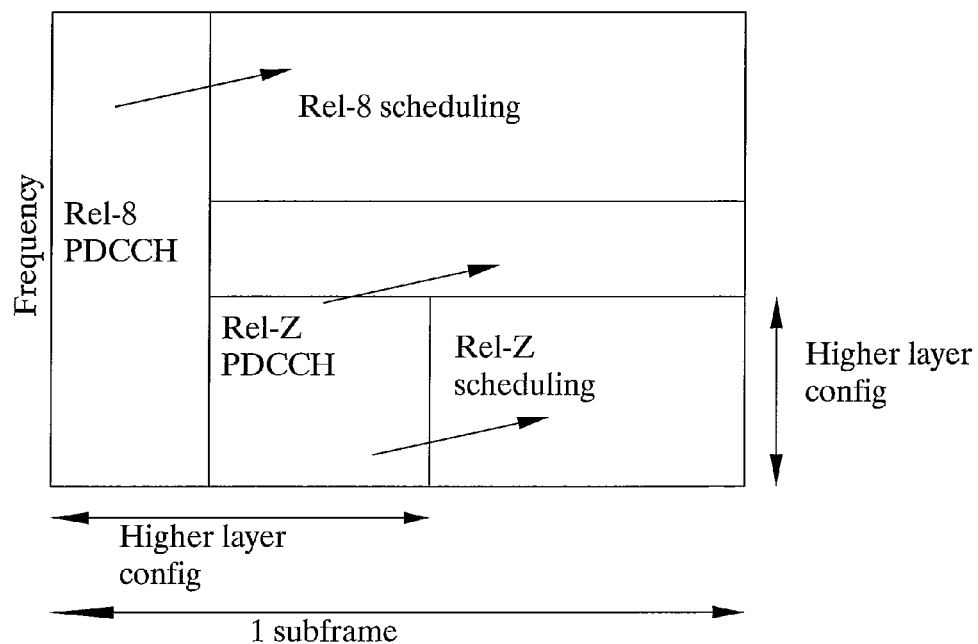
FIG. 6 illustrates a further embodiment of configuration of subframes according to the present disclosure.

Finally, with reference to Table. 6, the same situation as was described with relation to Table. 4 is valid, but an offset parameter is provided for all control format indicator values except "00". However, this prevents simultaneous scheduling of Rel-8 users and Rel-z users, unless the thus extended control region is bandwidth limited as illustrated in FIG. 6.

TABLE 6

| PCFICH bits | Rel-8 | Rel-Z with higher layer configuration |
| --- | --- | --- |
| 00 | Not allowed | Not allowed |
| 01 | 1 | 4 |
| 10 | 2 | 5 |
| 11 | 3 | 13 |

As mention previously, if the control region is extended in time only, user equipment conforming to different releases e.g. Rel-8 and Rel-z, need to be scheduled in different sub frames in order to avoid misinterpretation of an extended control region as a data region. An embodiment solving this problem will be described below and with reference to FIG. 6.

The embodiment in FIG. 6 enables increase of the total size of the control region e.g. PDCCH and enables simultaneous scheduling of Rel-8 and Rel-Z compatible UEs in a same sub frame. This is done by letting the control channel redefinition information e.g. offset parameter from higher layers contains both a time and a frequency configuration of the extended PDCCH for Rel-Z. The time configuration define an altered (compared to Rel-8) interpretation of the two bits carried by PCFICH, while the frequency configuration specify the frequency distribution of the extended PDCCH. For UE not supporting Rel-Z, the interpretation is according to 3GPP Rel-8 specifications.

An example of the offset in time and frequency is illustrated in FIG. 6, which shows schematically co-scheduling of Rel-8 and Rel-Z UEs. The figure shows an example how the extended PDCCH can be distributed in frequency. It is of course possible to divide the extended PDCCH in other ways over the frequency band. For example, the frequency configuration may mean a split of the extended PDCCH in two parts, where one part in distributed on the lower frequency part of the frequency band while the other part is distributed on the higher frequency part. The limiting factor of possible frequency configurations is the limitations in Rel-8 allocation possibilities. For example, for resource allocation type 0 the minimum scheduling unit is a PRBG (Physical Resource Block Group) which means that the frequency distribution of the extended PDCCH should be on whole PRBGs.

For Rel-8 UEs both UL and DL grants are transmitted on the Rel-8 PDCCH, as indicated by the from the control region in FIG. 6. The restriction for DL grants is that the UE should not be scheduled on the resources occupied by the extended PDCCH (i.e., Rel-Z PDCCH). On the part occupied by the Rel-8 PDCCH the PHICH is carried. For Rel-Z UEs UL and/or DL grants may be on either or both of the Rel-8 PDCCH and the Rel-Z PDCCH, as indicated by the two arrows extending from the control region in FIG. 6.

The frequency allocation of PDCCH can be in virtual resource blocks, which have scattered allocation in frequency. That do not change the function described in FIG. 2.

Figure 7:
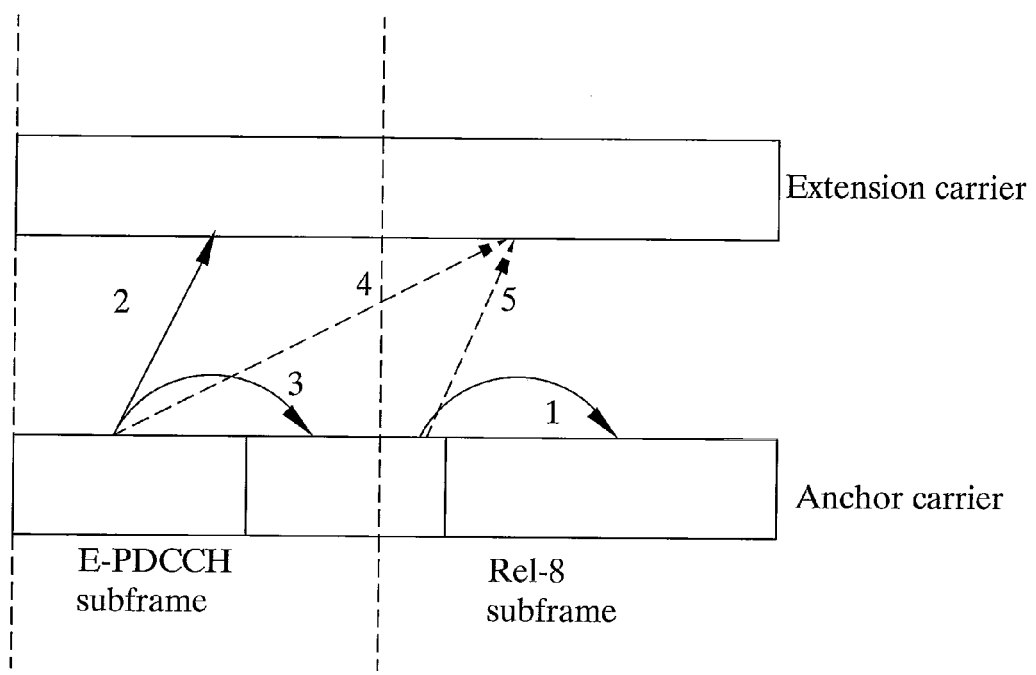
FIG. 7 illustrates yet another embodiment of configuration of subframes according to the present disclosure.

Yet another embodiment, with reference to FIG. 7, of the present disclosure concerns a multi-carrier system using extension carriers and an anchor carrier, as mentioned in the background section. In the current embodiment, only a single extension carrier is illustrated, but it is equally applicable to a case with a plurality of extension carriers. In a multi carrier system using extension carriers, there is one anchor carrier that is used for control signaling and data, and one or more extension carriers that are used for pure data transmission. The extension carriers carry no PHICH, PCFICH or PDCCH. In a corresponding manner as previously, the present embodiment will be described with two UE types, namely those supporting legacy or Rel-8 PDCCH scheduling and those supporting extended control region e.g. E-PDCCH and cross-carrier scheduling. Either of the previous solutions may be used, but initially only the extended control region e.g. E-PDCCH without joint scheduling will be described with reference to FIG. 7.

In the Rel-8 subframes Rel-8 UEs may be scheduled on the anchor carrier only (see solid arrow marked with "1" in the figure). The UL grants and PHICH for Rel-8 UE are carried on the Rel-8 PDCCH during Rel-8 subframes and during E-PDCCH subframes carried by the Rel-8 compatible part of the E-PDCCH.

Rel-Z UEs may in E-PDCCH subframes be cross-carrier-scheduled (see arrow "2" in the figure). In addition a Rel-Z UE may obtain a grant inside the E-DPCCH subframe on the anchor carrier (see arrow "3") and/or a grant on an extension carrier in an upcoming Rel-8 subframe (see arrow "4").

For scheduling of Rel-Z UEs in Rel-8 subframes there are two possibilities (shown with dashed arrows in FIG. 7. Either the grant on the extension carrier is given in advance (as discussed above, see arrow "4") meaning that the grant given for the Rel-8 subframes is carried in a previous E-PDCCH subframe. The other possibility is to use a cross-carrier-scheduling grant inside the Rel-8 compatible PDCCH (see arrow "5").

Figure 8:
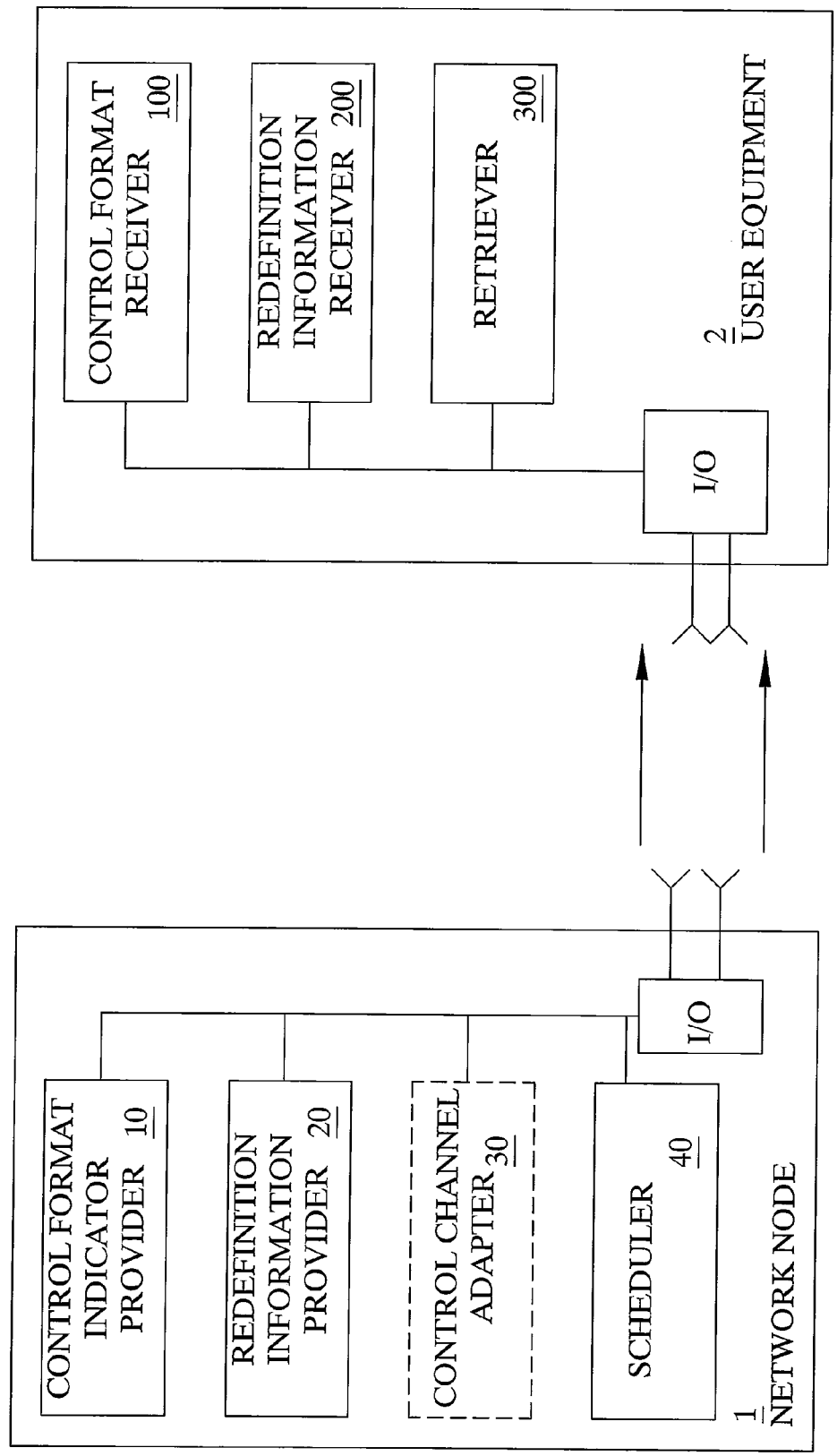
FIG. 8 illustrates embodiments of a network node and a user equipment according to the present disclosure.
Figure 9:
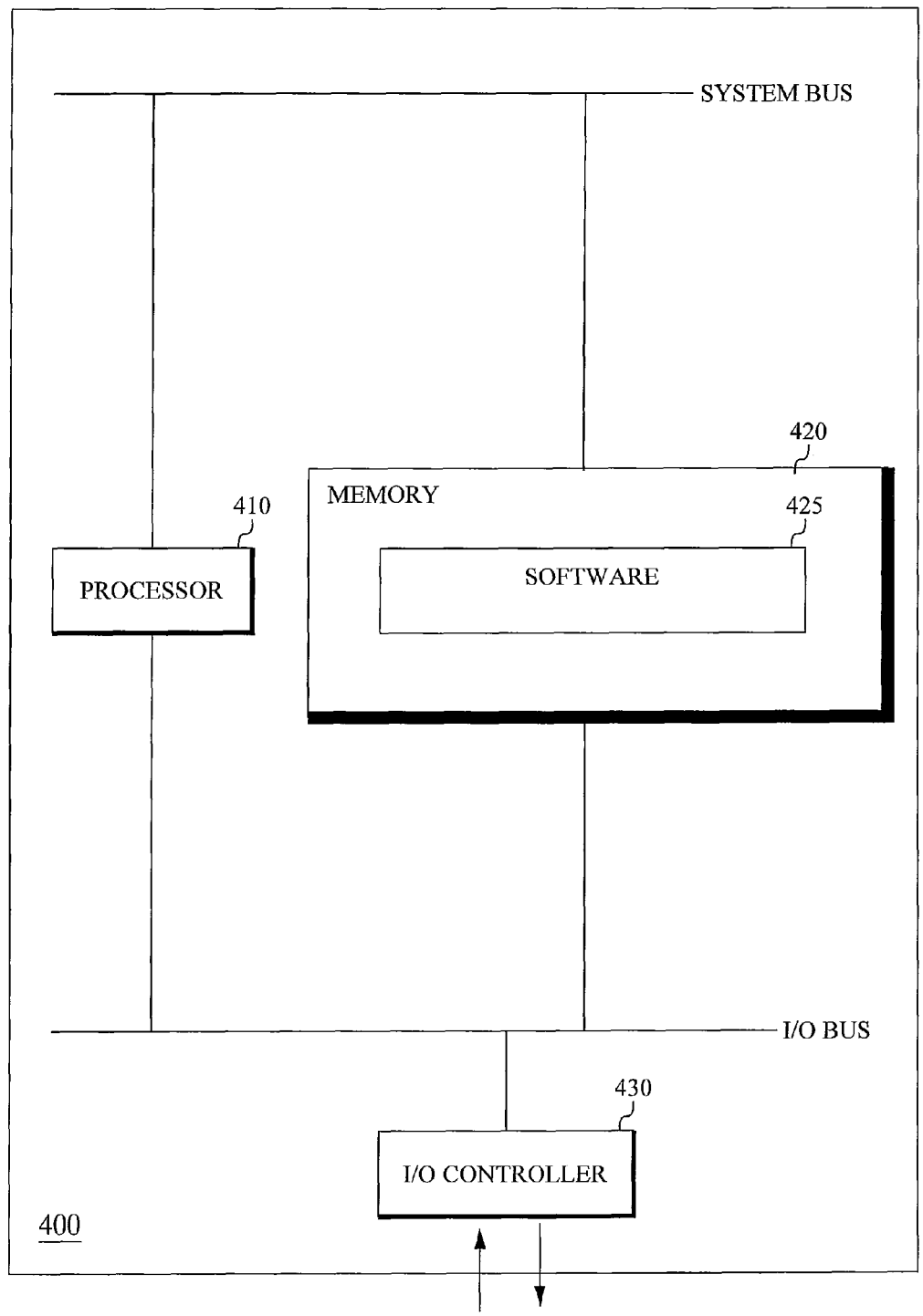
FIG. 9 illustrates a hardware implementation of the functionality of the present disclosure.

With reference to FIG. 8, embodiments of a network node 1 and a user equipment 2 implementing the present disclosure will be described.

An embodiment of a network node 1 in a communication system comprises all necessary functionality for transmitting and receiving signals, as well as functionality for processing signals to be transmitted and received signals. All such functionality is presented schematically as a generic input/output I/O box in FIG. 8. In addition, the network node 1 includes two antenna ports, illustrated by the two antenna elements. However, it is implied that also other configurations with a plurality of antenna ports and/or elements can likewise benefit from the present disclosure. The network node 1 includes a control format indicator provider 10 configured for providing a control format indicator for a control channel in a subframe. The control format indicator defines how many OFDM symbols that the control channel for the subframe occupies; implicitly this also indicates where the data region of the sub frame starts. Further, the network node 1 includes a control channel redefinition information provider 20, which provides control channel redefinition information e.g. a control channel offset parameter for the control channel. Based on the control format indicator and the control channel redefinition information e.g. control channel offset parameter, the network node 1 can provide a redefined control channel. The redefined control channel comprises an extended control channel when compared to the original control channel, thus enabling including additional control information as compared to a conventional control channel. Finally, the network node 1 includes a scheduler 40 configured to schedule user equipment in a sub frame based on the redefined control channel. Optionally the network node 1 includes a control channel adaptor 30 configured for adapting said control channel based on said control channel redefinition information together with said control format indicator to provide said redefined control channel An embodiment of a user equipment 2 in a communication system will be described below with reference to FIG. 8. The user equipment 2 includes all necessary functionality for transmitting and receiving signals, as well as functionality for processing signals to be transmitted and received signals. All such functionality is presented schematically as a generic input/output I/O box in FIG. 8. In addition, the network node 1 includes two antenna ports, illustrated by the two antenna elements. However, it is implied that also other configurations with a plurality of antenna ports and/or elements can likewise benefit from the present disclosure. The embodiment of the user equipment 2 includes a control format receiver 100 configured for receiving a control format indicator from a network node, which control format indicator provides information about a size of a control channel of the sub frame. In addition, the user equipment 2 includes a control channel redefinition information receiver 200 configured for receiving control channel redefinition information e.g. a control channel offset parameter from the network node, which control channel redefinition information together with the received control format indicator enables the user equipment to interpret a redefined control channel. Finally, the user equipment 2 includes a retriever 300 configured for retrieving control information and optionally data from a sub frame based on the thus interpreted redefined control channel. In other words, based on the control format indicator and the control channel redefinition information e.g. control channel offset parameter, the user equipment is able to correctly interpret the control channel and locate control information and optionally data in the sub frame. Depending on the system, the user equipment can use the provided information to locate data in the same subframe as the control channel, or in a parallel or subsequent sub frame.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

In the following, an example of a computer-implementation will be described with reference to FIG. 13. A computer 400 comprises a processor 410, an operating memory 420, and an input/output unit 430. In this particular example, at least some of the steps, functions, procedures, and/or blocks described above are implemented in software 425, which is loaded into the operating memory 420 for execution by the processor 410. The processor 410 and memory 420 are interconnected to each other via a system bus to enable normal software execution. The I/O unit 430 may be interconnected to the processor 410 and/or the memory 420 via an I/O bus to enable input and/or output of relevant data such as input parameter(s) and/or resulting output parameter(s).

Advantages of the present disclosure allow for extending the control channel region in a backwards compatible manner. The control channel region extension solves the problem associated with PDCCH limitations that occur in certain scenarios e.g. in cases when there are many low rate UEs (e.g. in scenarios with lots of VoIP, M2M, gaming applications); when there are many UEs that are cross-carrier scheduled; or when the anchor carrier has a limited bandwidth.

In addition, the solution according to the present disclosure is more robust and has lower complexity compared to the state-of-the art solution (that was rejected in 3GPP) where a PDCCH extension is dynamically scheduled inside the PDSCH by means of a special grand on the primary PDCCH. By using higher layer scheduling where the interpretation of the PCFICH is changed in certain sub-frames the UE behavior is equally robust as before. The UE complexity is reduced since the PDCCH decoding is still a one step process compared to the known two step process.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method adapted to a control channel in a network node in a wireless communication system, said wireless communication system comprising said network node and at least one user equipment, and said method comprising:
    determining and providing control channel redefinition information to said at least one user equipment node;
    providing a control format indicator for said control channel;
    configuring said control channel based on said control format indicator and said control channel redefinition information, to provide a redefined control channel for signaling to said at least one user equipment; and
    scheduling at least said user equipment in a sub frame based on said redefined control channel.

2. The method according to claim 1, wherein said control channel redefinition information comprises a control channel offset parameter.

3. The method according to claim 2, wherein said control channel offset parameter comprises at least a time offset.

4. The method according to claim 2, wherein said control channel offset parameter comprises a frequency range.

5. The method according to claim 1, further comprising scheduling only non-legacy users in said sub frame comprising said redefined control channel.

6. The method according to claim 1, further comprising scheduling legacy users in said sub frame not comprising said redefined control channel.

7. The method according to claim 1, further comprising determining said control channel redefinition information based on a current load in said wireless communication system.

8. A method of interpreting a redefined control channel in a user equipment in a communication system that includes a network node, said method comprising:
    receiving control channel redefinition information from said network node;
    receiving, in a sub frame, a control format indicator from said network node, said control format indicator providing information about a size of a control channel of said sub frame, said control channel redefinition information together with said received control format indicator providing interpretation of said redefined control channel being configured based on said control channel redefinition information and said control format indicator; and
    retrieving control information and optionally data from at least said sub frame, based on said interpreted redefined control channel.

9. The method according to claim 8, wherein said control channel redefinition information comprises a control channel offset parameter.

10. The method according to claim 8, wherein said control channel redefinition information comprises a table.

11. A network node in a wireless communication system, wherein the network node comprising:
    a control format indicator provider configured for providing a control format indicator for a control channel;
    a control channel redefinition information provider configured for determining and providing control channel redefinition information for said control channel, wherein said control channel is configured based on said control channel redefinition information together with said control format indicator to provide a redefined control channel; and
    a scheduler configured for scheduling user equipments in a sub frame based on said redefined control channel.

12. The network node according to claim 11, wherein said network node further comprises a control channel adaptor adapted to said control channel based on said control channel redefinition information together with said control format indicator to provide said redefined control channel.

13. The network node according to claim 11, wherein said network node comprises a base station node.

14. A user equipment in a wireless communication system, said user equipment comprising:
    a control format receiver configured for, receiving a control format indicator from a network node in a sub frame, said control format indicator providing information about a size of a control channel of said sub frame;
    a control channel redefinition information receiver configured for receiving control channel redefinition information from said network node, said control channel redefinition information together with said received control format indicator providing interpretation of a redefined control channel being configured based on said control channel redefinition information and said control format indicator; and
    a retriever configured for retrieving control information and optionally data from said sub frame based on said interpreted redefined control channel.

* * * * *